Feb. 23, 1926.
T. H. OPPENHEIM ET AL
1,574,164
EAR CONVEYER FOR CORN HUSKING MACHINES
Filed Nov. 21, 1924
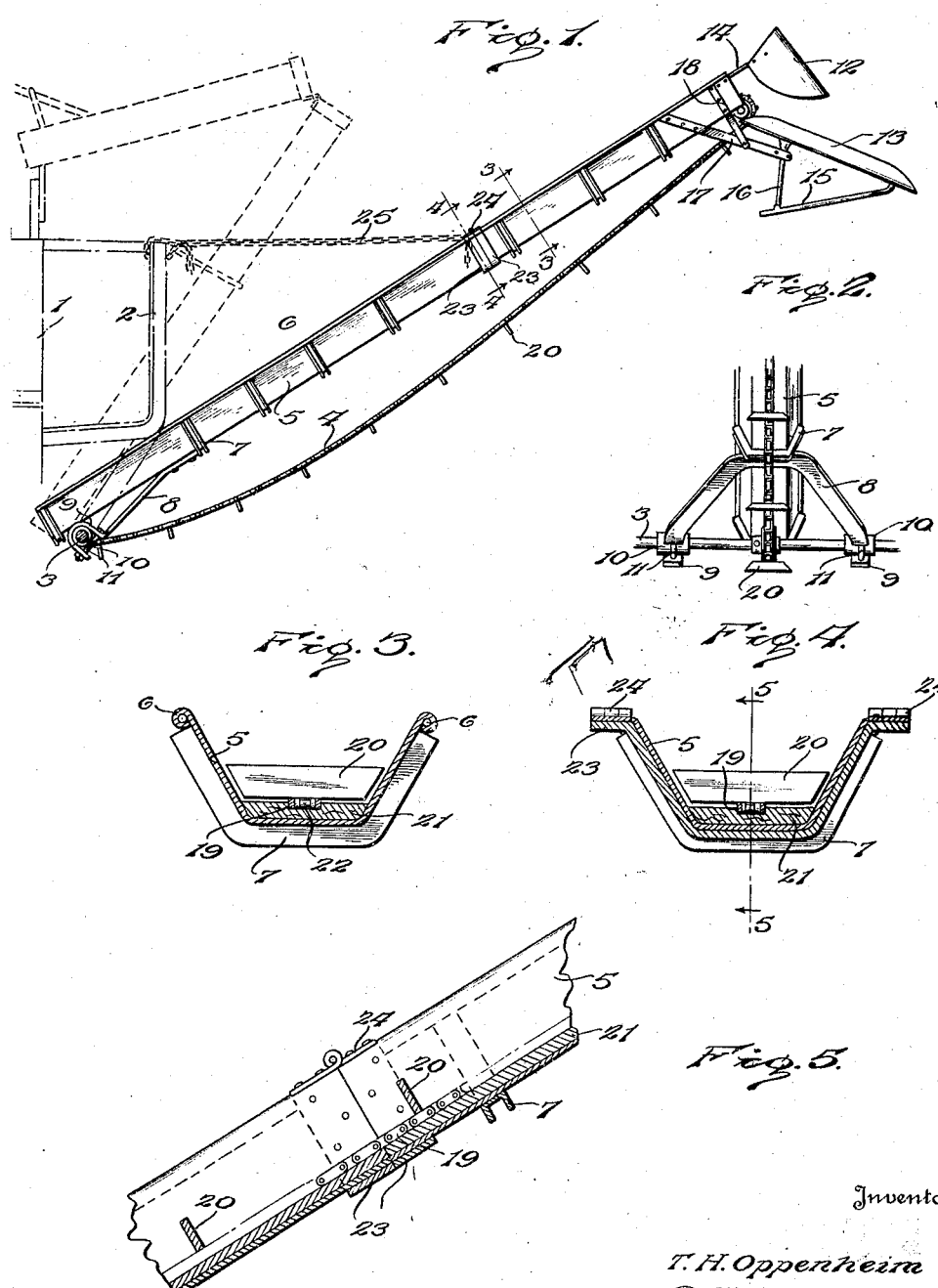
Inventor
T. H. Oppenheim
B. Selhorst
By Lacey & Lacey, Attorneys Patented Feb. 23, 1926.

1,574,164

UNITED STATES PATENT OFFICE.

THEODORE H. OPPENHEIM AND BERNARD SELHORST, OF COLDWATER, OHIO, ASSIGNORS TO NEW IDEA SPREADER CO., OF COLDWATER, OHIO, A CORPORATION OF OHIO.

EAR CONVEYER FOR CORN-HUSKING MACHINES.

Application filed November 21, 1924. Serial No. 751,354.

*To all whom it may concern:*

Be it known that we, THEODORE H. OPPENHEIM and BERNARD SELHORST, citizens of the United States, residing at Coldwater, in the county of Mercer and State of Ohio, have invented certain new and useful Improvements in Ear Conveyers for Corn-Husking Machines, of which the following is a specification.

This invention relates to corn husking machines and has special reference to the conveyer by which the ears are carried from the machine and delivered to a bin or other receptacle. The object of the invention is to provide a simple construction, which will possess great strength and which will permit the ears to be carried from the husking machine to the delivery point, without excessive wear upon any part of the conveyer.

The invention is illustrated in the accompanying drawing, in which:

Figure 1 is a side elevation of our improved conveyer, showing it extended for use, in full lines, illustrating, by dotted lines, its position when folded and not in use;

Fig. 2 is a detail bottom plan view of the hinged or supporting end of the conveyer;

Fig. 3 is an enlarged transverse section on the line 3—3 of Fig. 1;

Fig. 4 is a similar view, on the line 4—4 of Fig. 1;

Fig. 5 is an enlarged longitudinal section on the line 5—5 of Fig. 4.

In the drawing, we have indicated at 1 a portion of a corn-husking machine which is equipped with platform supporting brackets 2 at its delivery end. Mounted in suitable bearings upon the end of the corn-husking machine is a shaft 3 which is rotated through any suitable or preferred gearing to drive the endless conveyor belt 4. The said belt 4 has its upper run disposed longitudinally of a trough 5 which is formed from sheet metal to define a bottom and side walls, which, as clearly shown in Figs. 3 and 4, are preferaby diverging, although the conveyer trough may have any other approved cross-sectional contour. The edges of the side walls are rolled upon themselves, as shown at 6, thereby forming beads extending longitudinally of the trough so as to prevent buckling of the same and, to impart further rigidity to the trough, we secure to the bottom and the side walls of the same, at intervals beween the ends thereof, channel bars or braces 7 which are firmly riveted or welded to the body of the trough. Adjacent the lower extremity of the trough, we secure thereto a yoke 8 which diverges laterally from the trough and has the ends of its side members formed into loops or hooks 9 which are adapted to fit over and partly embrace the shaft 3, bearing sleeves 10 being preferably fitted around the shaft within the hooks so as to prevent wear upon the shaft and permit a rocking movement of the hooks when it is desired to fold the elevator back over upon the husking machine, as indicated by dotted lines in Fig. 1. To retain the hooks 9 upon the shaft, bolts 11 are inserted through the sides of the hooks, as shown and as will be readily understood by reference to Figs. 1 and 2.

At its upper extremity a hood or deflector 12 is provided so that the ears of corn brought to the upper end of the trough by the conveyer chain or belt 4, will be positively deflected onto the chute 13 which will direct them into the bin or other receptacle. The hood or deflector 12 is preferably a plate of sheet metal, partly doubled upon itself, so as to present an arcuate cross section, and connected with the upper end of the trough 5 by supporting arms or bars 14. The chute 13 is also of sheet metal and is provided upon its under side with a yoke or frame 15, whereby buckling of the chute is prevented, the post 16, which constitutes the rear end of said frame, being clamped by supporting arms 17, projecting from and secured to the sides of the trough. Braces 18 extend between the said supporting arms and the trough to impart additional rigidity to the structure.

The conveyer chain 4 consists of links pivotally connected together, as indicated at 19, and at intervals transverse feeder plates 20 are secured to said links and project laterally therefrom so as to engage behind the ears of corn and cause them to travel upwardly through the trough 5 to be delivered into the chute 13. The feeder blades or plates 20 terminate close to but out of contact with the side walls of the trough so as to avoid wear upon said walls, and, to overcome noise due to travel of the chain through the trough and minimize wear upon the bottom of the trough and the chain, we secure therein a board 21 which extends from end to end of the trough and is provided centrally with a longitudinal groove 22 in which the chain 19 travels and by which it is guided, as shown in Figs. 3 and 4. The board 21 is removable so that it may be renewed from time to time as may be found necessary.

The trough is divided midway, or substantially midway, its ends and the board 21 is, of course, also divided, as shown in Fig. 5. The meeting ends of the sections of the trough are reinforced by plates 23 secured to the outer sides of the trough immediately at the division between the members of the trough, and the bead or roll 6 on the side edge of the trough may be cut away at the point of division, so that the reinforcing plates 23 may extend through the bead or roll and project laterally outwardly to support hinge members 24. These hinge members may be of any approved form which will permit the upper or outer section of the trough or elevator to fold inwardly over the lower section, as indicated by the dotted lines in Fig. 1. The hinge members are bolted to the lateral extensions of the reinforcing plates 23 and the shanks of these bolts, or extra holes in extensions of the plates or leaves of the hinges, form convenient means for attaching the ends of chains 25 which are secured to the platform-supporting brackets or arms 2 on the rear end of the husking machine. By engaging different links of the chains with the hinge securing bolts or the reinforcing plates 23, the conveyer may be set at any desired angle, and it will be readily noted that the yoke 8 with the hooks 9 at the ends thereof constitute a hinged or pivotal mounting for the conveyer to permit it to be swung close to the husking machine and thereby guard against accidents when the machine is driven over a road. It will be noted that our conveyer is mounted in such a manner that it does not interfere with the movments of the operator in any way. The operator stands upon a platform carried by the arms 2 and does not have to crawl over or under the chains 25.

Our improved ear conveyer is very simple and strong and may be easily manufactured at a low cost. It is of light weight but at the same time is strong and durable and is neat in design so that it does not detract from the appearance of any machine on which it may be mounted. It will be understood, of course, that the conveyer may be mounted upon any type of corn-husking machine and by its operation will positively and effectually convey the husked ears of corn from the machine to a point of storage or delivery.

Having thus described the invention, we claim:

An ear conveyer for corn-husking machines comprising a sheet metal trough including two alined sections each having integral bottom and sides, reinforcing beads formed along the upper edges of the sides, reinforcing channels secured on the under surfaces of the bottom and the sides at intervals, reinforcing bands secured on the under surface of the bottom and sides at the meeting ends of the sections of the trough and having their upper ends extending outwardly at the edges of the sides of the trough, hinges secured upon the outwardly extending ends of the bands and connecting the sections of the trough whereby the upper section may fold over onto the lower section, an endless belt having its upper run passing through the trough, and means for supporting the trough on the end of a corn-husking machine for swinging movement in a vertical plane.

In testimony whereof we affix our signatures.

THEODORE H. OPPENHEIM. [L. S.]
BERNARD SELHORST. [L. S.]